US012580326B2

(12) United States Patent
Coelho De Souza

(10) Patent No.: US 12,580,326 B2
(45) Date of Patent: Mar. 17, 2026

(54) DESIGNS FOR IMPROVED ANTENNA ARRAY ELEMENT ISOLATION

(71) Applicant: QUALCOMM Incorporated, San Diego, CA (US)

(72) Inventor: Aline Coelho De Souza, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 18/507,199

(22) Filed: Nov. 13, 2023

(65) Prior Publication Data

US 2025/0158290 A1 May 15, 2025

(51) Int. Cl.

| | |
|---|---|
| ***H01Q 1/38*** | (2006.01) |
| ***H01Q 1/52*** | (2006.01) |
| ***H01Q 21/00*** | (2006.01) |
| ***H01Q 21/06*** | (2006.01) |
| ***H01Q 21/08*** | (2006.01) |

(52) U.S. Cl.

CPC ........... *H01Q 21/065* (2013.01); *H01Q 1/523* (2013.01); *H01Q 21/0087* (2013.01); *H01Q 21/08* (2013.01)

(58) Field of Classification Search

CPC .. H01Q 1/38; H01Q 1/50; H01Q 1/52; H01Q 1/523; H01Q 21/00; H01Q 21/0087; H01Q 21/06; H01Q 21/061; H01Q 21/065; H01Q 21/08; H01Q 21/24; H01Q 9/04; H01Q 9/0407

See application file for complete search history.

(56) References Cited

U.S. PATENT DOCUMENTS

| | | | | |
|---|---|---|---|---|
| 10,381,735 | B2 * | 8/2019 | Miraftab | H01Q 9/0485 |
| 10,741,908 | B2 * | 8/2020 | Sanders | H01Q 9/0428 |
| 10,819,041 | B1 * | 10/2020 | Kee | H01Q 21/064 |
| 11,978,962 | B2 * | 5/2024 | Zólomy | H01Q 15/0066 |

(Continued)

FOREIGN PATENT DOCUMENTS

| | | | |
|---|---|---|---|
| CN | 104638366 | A | 5/2015 |
| CN | 106848583 | A | 6/2017 |
| CN | 114142231 | A | 3/2022 |

OTHER PUBLICATIONS

Arun H., et al., "Deployment of Modified Serpentine Structure for Mutual Coupling Reduction in MIMO Antennas", IEEE Antennas and Wireless Propagation Letters, vol. 13, Jan. 1, 2014, pp. 277-280, XP011540398, figures 1, 7, abstract, Sections I-IV.

(Continued)

*Primary Examiner* — Tho G Phan

(74) *Attorney, Agent, or Firm* — Holland & Hart LLP/Qualcomm Incorporated

(57) ABSTRACT

Techniques are provided for improving antenna isolation and angle-of-arrival (AoA) performance of an antenna array. An example antenna array includes a plurality of patch antenna elements disposed on a planar substrate, and one or more resonator elements disposed on the planar substrate and between each of the plurality of patch antenna elements, wherein each of the one or more resonator elements includes a first repeating S-shaped conductor in a first orientation, and a second repeating S-shaped conductor in a second orientation that is rotated 180 degrees relative to the first orientation.

21 Claims, 13 Drawing Sheets

(56) References Cited

U.S. PATENT DOCUMENTS

| | | | | |
|---|---|---|---|---|
| 12,027,773 | B2 * | 7/2024 | Evtyushkin | H01Q 3/005 |
| 12,155,121 | B2 * | 11/2024 | Huang | H01Q 21/08 |

OTHER PUBLICATIONS

International Search Report and Written Opinion—PCT/US2024/055327—ISA/EPO—Feb. 11, 2025.

Zulfi., et al., "Suppression of EM Coupling Between Microstrip Patch Antennas Using A Simple Meander Line Structure", 2023 IEEE International Symposium on Antennas and Propagation and USNC-URSI Radio Science Meeting (USNC-URSI), IEEE, Jul. 23, 2023, pp. 1455-1456, XP034420444, figures 1-2, abstract, Sections I-IV.

* cited by examiner

DESIGNS FOR IMPROVED ANTENNA ARRAY ELEMENT ISOLATION

BACKGROUND

The use of wireless devices for many everyday activities is becoming common. Modern wireless devices may make use of one or more wireless communication technologies. For example, a wireless device may communicate using a short range communication technology such as WiFi technology, Bluetooth® technology, ultrawideband (UWB) technology, millimeter wave (mmWave) technology, etc. The use of short range communication technologies, such as WiFi and Bluetooth®, in wireless devices has become much more common in the last several years and is regularly used in retail businesses, offices, homes, cars, manufacturing operations, and public gathering places. To facilitate and/or enable wireless signal applications, numerous types of antennas have been developed, with different antennas used based on the needs of an application, e.g., distance, frequency, operational frequency bandwidth, antenna pattern beam width, gain, beam steering, etc. Indoor positioning, tracking, and other direction finding applications require increased sensitivity to the angle-of-arrival (AoA) for received RF signals.

SUMMARY

An example antenna array according to the disclosure includes a plurality of patch antenna elements disposed on a planar substrate, and one or more resonator elements disposed on the planar substrate and between each of the plurality of patch antenna elements, wherein each of the one or more resonator elements includes a first repeating S-shaped conductor in a first orientation, and a second repeating S-shaped conductor in a second orientation that is rotated 180 degrees relative to the first orientation.

An example antenna array according to the disclosure includes a first antenna element disposed on a planar substrate, a second antenna element disposed on the planar substrate, and a resonator element disposed on the planar substrate and between the first antenna element and the second antenna element, wherein the resonator element includes a plurality of non-closed loop structures configured to resonate at an operational frequency associated with the first antenna element and the second antenna element.

An example method for manufacturing an antenna array with improved antenna element isolation according to the disclosure includes disposing, on or in a dielectric substrate, a plurality of patch antenna elements, and disposing, on or in the dielectric substrate and between each of the plurality of patch antenna elements, a plurality of resonator elements configured to form a plurality of semi-closed loops to trap electromagnetic fields and reduce coupling between the plurality of patch antenna elements.

An example method for manufacturing an antenna array with improved antenna element isolation according to the disclosure includes disposing, on or in a dielectric substrate, a plurality of patch antenna elements, and disposing, on or in the dielectric substrate and between each of the plurality of patch antenna elements, a resonator element comprising a first repeating S-shaped conductor in a first orientation, and a second repeating S-shaped conductor in a second orientation, wherein the second orientation is rotated 180 degrees relative to the first orientation.

Items and/or techniques described herein may provide one or more of the following capabilities, as well as other capabilities not mentioned. Wireless devices may be configured to exchange positioning signals to determine a distance between the devices (e.g., based on time-of-flight measurements) and a bearing to one another (e.g., based on angle-of-arrival measurements). An antenna array may include two or more patch antenna elements disposed in a one-dimensional or two-dimensional array. Resonator elements may be disposed between each of the patch antenna elements. The resonator elements may include non-closed (i.e., semi-closed) loop structures configured to resonate at the operational frequency of the antenna array. The resonator elements may increase the isolation between the antenna elements. The resonator elements may reduce coupling between antenna elements in either vertical or horizontal polarization. Angle-of-arrival (AoA) discrimination may be increased. The size of an antenna array may be reduced. Other capabilities may be provided and not every implementation according to the disclosure must provide any, let alone all, of the capabilities discussed.

DETAILED DESCRIPTION

Figure 1:
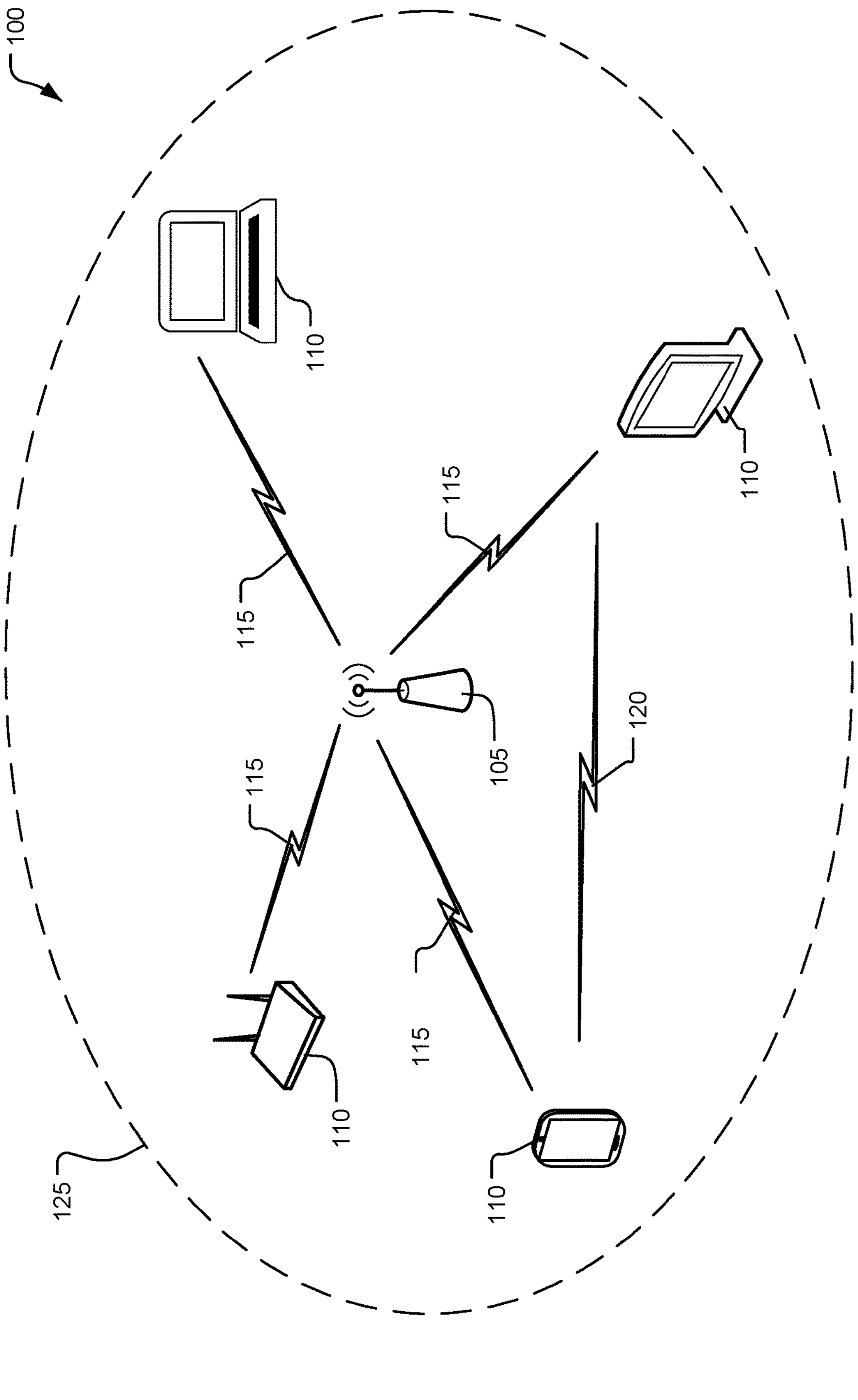
FIG. 1 is a block diagram of an example wireless local area network (WLAN).

Techniques are discussed herein for improving antenna isolation and angle-of-arrival (AoA) performance of an antenna array. Wireless devices may be configured to determine ranges between the devices and corresponding AoA measurements based on exchanging radio frequency (RF) signals. Cellular, WiFi, BT, sidelink, ultrawideband (UWB), and other wireless technologies may utilize ranging signals such as positioning reference signals (PRS), fine timing messages (FTM), and other time-scheduled or contention-free techniques to determine the relative distance between stations. For example, wireless positioning technologies may be utilized to provide accurate relative positioning between devices within a limited range. Two wireless devices may be configured to exchange RF signals to determine time-of-flight (ToF) and AoA information for the RF signals. Antenna array designs for AoA applications for some radio technologies may be problematic based on form factor requirements for an associated receiver. For example, use cases for Internet-of-Things (IoT) devices and other reduced capability (RedCap) devices such as tags, smart labels, and other asset tracking devices and retail applications, may require smaller form factors. These smaller form factors may create issues for Bluetooth®/BLE® technologies because the theoretical space between antenna elements should be in the order of a half-wavelength of the operational frequency (e.g., approximately 6 cm for BT/BLE). The techniques provided herein may be used to reduce the size of an antenna array by reducing the distances between the antenna elements in an array.

In an example, a reduced AoA antenna array size may include resonators disposed between the antenna elements. The resonators may be combined to form shapes to generate semi-closed loops configured to trap electromagnetic fields and reduce the coupling between the antennas. The resonators may be used to reduce the distance between antenna elements below a half-wavelength, while maintaining required isolation levels and operational angular range. The resonators may reduce the level of induced current, from one element to another, and the energy of fields generated by the current induced at the resonator may be confined at the resonator structure. The resonators may be printed based on existing printed circuit board (PCB) manufacturing techniques and thus may provide a cost effective technique for reducing the size of an antenna array while enabling sufficient AoA measurement performance. The resonators may be configured to operate with patch antennas. The resonator may be printed on the same PCB layer as patch antenna elements, or other PCB layers if a multi-layer antenna array design is required. The resonators may enable the distance between antenna elements to be reduced, and therefore enable a reduction in the total size of an antenna array. These techniques and configurations are examples, and other techniques and configurations may be used.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, a block diagram illustrates an example of a WLAN network 100 such as, e.g., a network implementing IEEE 802.11 and IEEE 802.15 families of standards. The WLAN network 100 may include an access point (AP) 105 and one or more wireless devices 110 or stations (STAs) 110, such as mobile stations, head mounted devices (HMDs), personal digital assistants (PDAs), asset tracking devices, other handheld devices, netbooks, notebook computers, tablet computers, laptops, display devices (e.g., TVs, computer monitors, etc.), printers, IoT devices, asset tags, key fobs, vehicles, etc. The AP 105 and the wireless devices 110 may be WiFi, Bluetooth, and/or UWB capable devices. While one AP 105 is illustrated, the WLAN network 100 may have multiple APs 105. Each of the wireless devices 110, which may also be referred to as mobile stations (MSs), mobile devices, access terminals (ATs), user equipment(s) (UE), subscriber stations (SSs), or subscriber units, may associate and communicate with an AP 105 via a communication link 115. Each AP 105 has a geographic coverage area 125 such that wireless devices 110 within that area can typically communicate with the AP 105. The wireless devices 110 may be dispersed throughout the geographic coverage area 125. Each wireless device 110 may be stationary or mobile.

A wireless device 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) is used to connect APs 105 in an extended service set. A geographic coverage area 125 for an access point 105 may be divided into sectors making up a portion of the coverage area. The WLAN network 100 may include access points 105 of different types (e.g., metropolitan area, home network, etc.), with varying sizes of coverage areas and overlapping coverage areas for different technologies. In other examples, other wireless devices can communicate with the AP 105.

While the wireless devices 110 may communicate with each other through the AP 105 using communication links 115, each wireless device 110 may also communicate directly with one or more other wireless devices 110 via a direct wireless link 120. Two or more wireless devices 110 may communicate via a direct wireless link 120 when both wireless devices 110 are in the AP geographic coverage area 125 or when one or neither wireless device 110 is within the AP geographic coverage area 125. Examples of direct wireless links 120 may include WiFi Direct connections, connections established by using a WiFi Tunneled Direct Link Setup (TDLS) link, 5G-NR sidelink, PC5, UWB, Bluetooth, and other P2P group connections. The wireless devices 110 in these examples may communicate according to the WLAN radio and baseband protocol including physical and MAC layers from IEEE 802.11 and IEEE 802.15, and their various versions. For example, the one or more of the wireless devices 110 and the AP 105 may be configured to utilize WiFi, Bluetooth, and/or UWB signals for communications and/or positioning applications.

Figure 2:
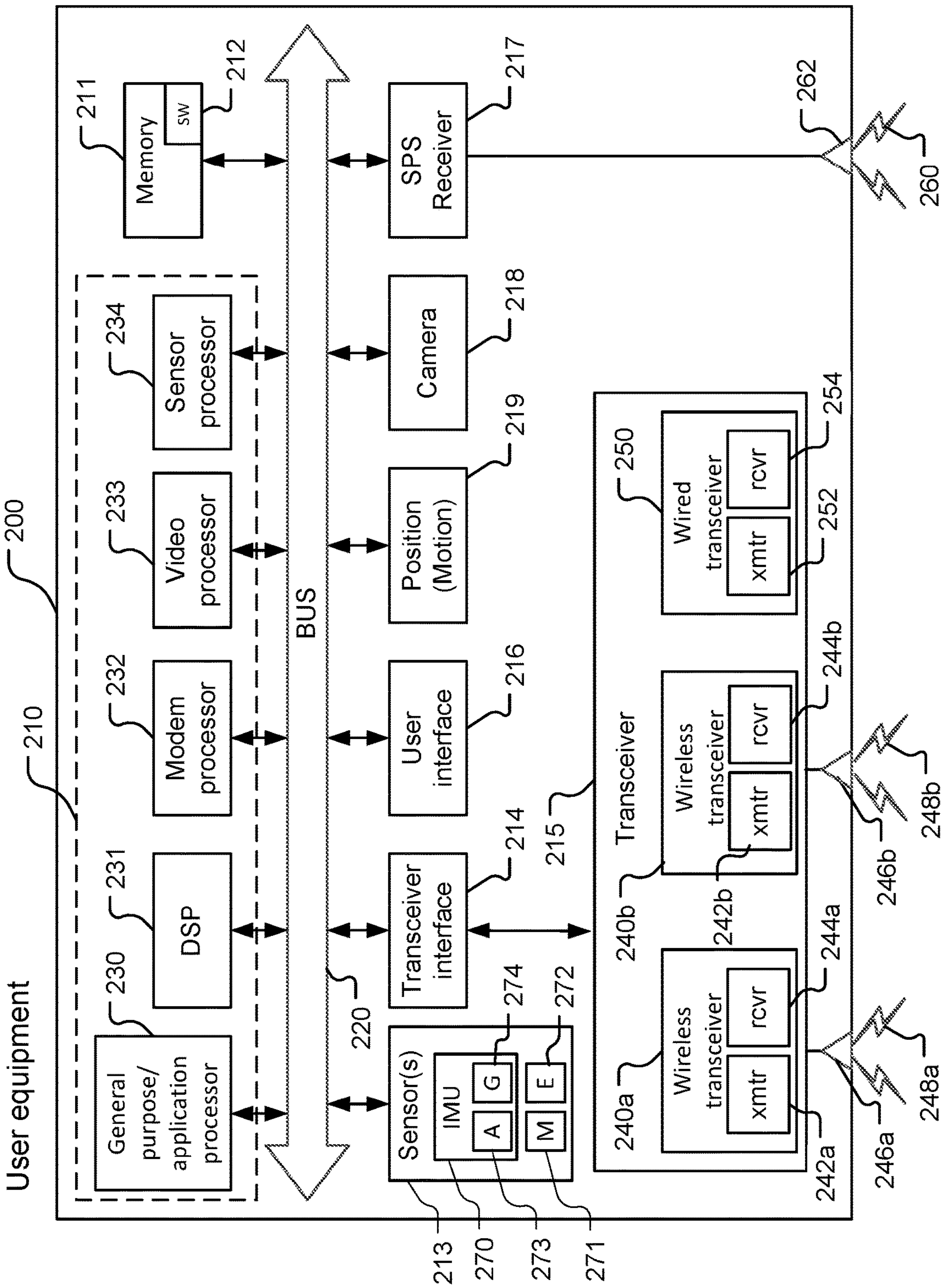
FIG. 2 is a block diagram of components of an example wireless device.

Referring also to FIG. 2, a UE 200 is an example of the wireless devices 110 and comprises a computing platform including a processor 210, memory 211 including software (SW) 212, one or more sensors 213, a transceiver interface 214 for a transceiver 215 (including one or more wireless transceivers such as a first wireless transceiver 240*a*, a second wireless transceiver 240*b*, and optionally a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatuses (e.g., the camera 218, the position (motion) device 219, and/or one or more of the sensor(s) 213, etc.) may be omitted from the UE 200. The processor 210 may include one or more hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing and ultrasound. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software (which may also include firmware) 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceivers 240*a-b*. Other example configurations include one or more of the processors 230-234 of the processor 210, the memory 211, the wireless transceivers 240*a-b*, and one or more of the sensor(s) 213, the user interface 216, the SPS receiver 217, the camera 218, the PMD 219, and/or the wired transceiver 250. Other configurations may not include all of the components of the UE 200. For example, an IoT device may include more wireless transceivers 240*a-b*, the memory 211 and a general-purpose processor 230. A multi-link device may simultaneously utilize the first wireless transceiver 240*a* on a first link using a first frequency band, and the second wireless transceiver 240*b* on a second link using a second frequency band. Additional transceivers may also be used for additional links and frequency bands and radio access technologies.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile. In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer (s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include wireless transceivers 240*a-b* and a wired transceiver 250 configured to communicate with other devices through wireless connections and wired connections, respectively. In an example, each of the wireless transceivers 240*a-b* may include respective transmitters 242*a-b* and receivers 244*a-b* coupled to one or more respective antennas 246*a-b* for transmitting and/or receiving wireless signals 248*a-b* and transducing signals from the wireless signals 248_a-b_ to wired (e.g., electrical and/or optical) signals and from wired (e.g., electrical and/or optical) signals to the wireless signals 248_a-b_. Thus, the transmitters 242_a-b_ may be the same transmitter, or may include multiple transmitters that may be discrete components or combined/integrated components, and/or the receivers 244_a-b_ may be the same receiver, or may include multiple receivers that may be discrete components or combined/integrated components. The wireless transceivers 240_a-b_ may be configured to communicate signals (e.g., with access points and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11ax and 802.11be), WiFi, WiFi Direct (WiFi-D), Bluetooth®, IEEE 802.15 (UWB), Zigbee etc. The wired transceiver 250 may include a transmitter 252 and a receiver 254 configured for wired communication. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the SPS signals 260 to wired signals, e.g., electrical or optical signals, and may be integrated with one or more of the antennas 246_a-b_. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceivers 240_a-b_) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248_a-b_) for trilateration or mulilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion. In an example the PMD 219 may be referred to as a Positioning Engine (PE), and may be performed by the general-purpose processor 230. For example, the PMD 219 may be a logical entity and may be integrated with the general-purpose processor 230 and the memory 211.

Figure 3A:
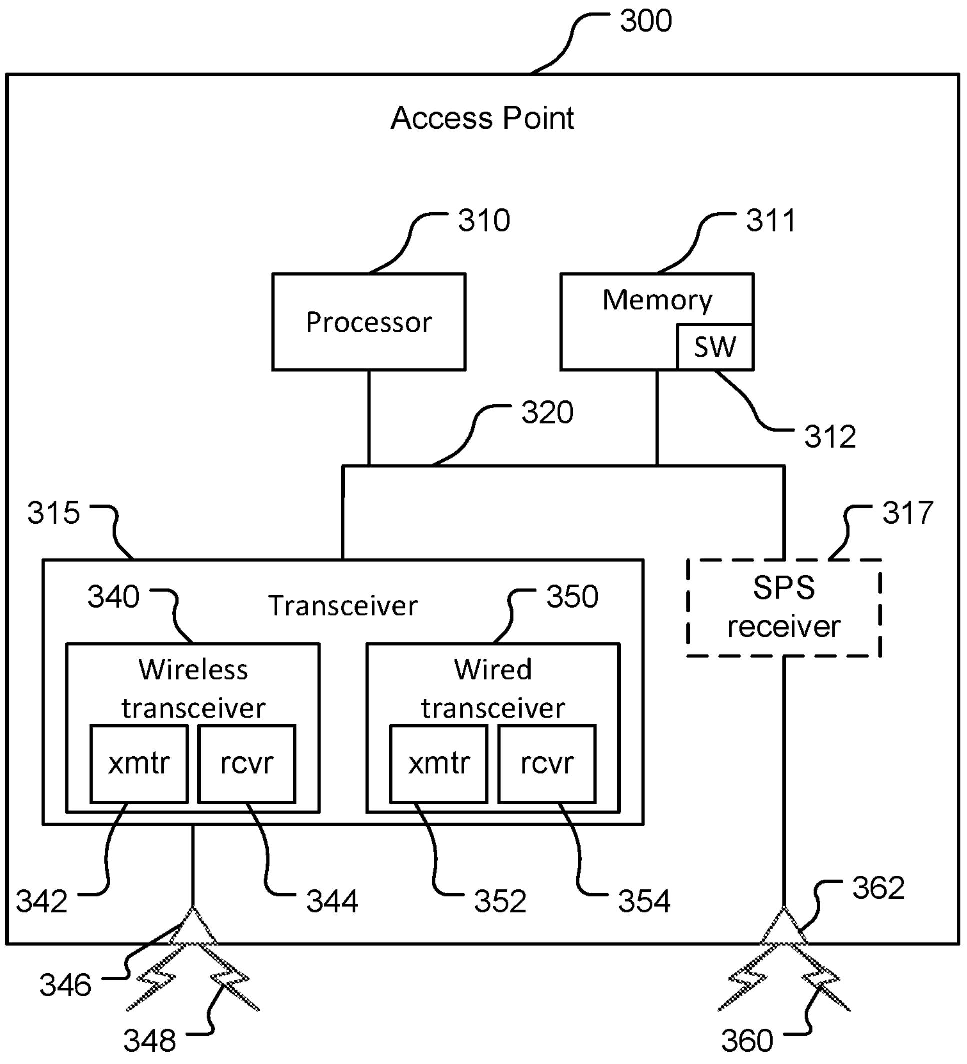
FIG. 3A is a block diagram of components of an example access point.

Referring also to FIG. 3A, an example of an access point (AP) 300 such as the AP 105 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatuses (e.g., a wireless interface and/or the SPS receiver 317) may be omitted from the AP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as IEEE 802.11 (including IEEE 802.11ax and 802.11be), WiFi, WiFi Direct (WiFi-D), Bluetooth®, IEEE 802.15 (UWB), Zigbee etc. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

Figure 3B:
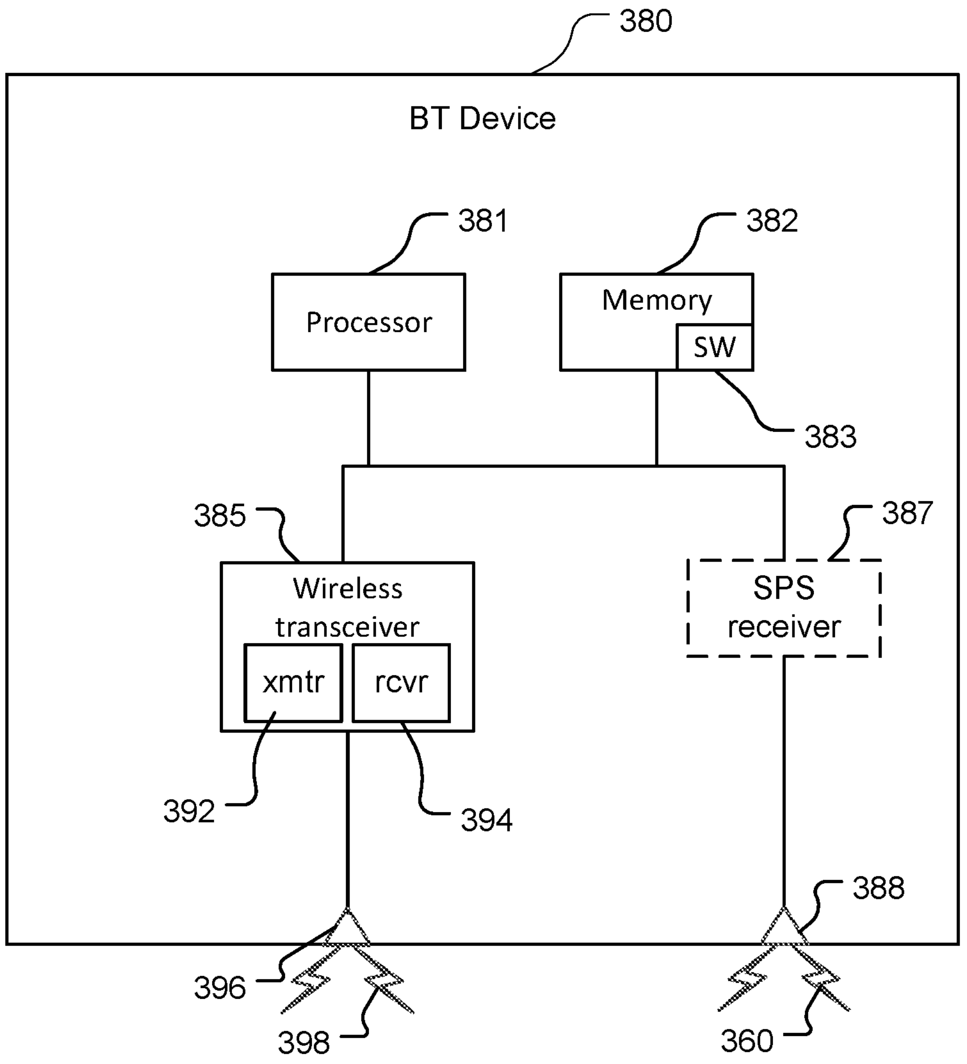
FIG. 3B is a block diagram of components of an example Bluetooth® (BT) device.

Referring also to FIG. 3B, an example of a Bluetooth® (BT) device 380 such as an asset tag, key fob, TV remote, security system (e.g., vehicle, commercial, etc.), or other device configured to send and receive BT RF transmissions. The BT device 380 comprises a computing platform including a processor 381, memory 382 including software (SW) 383, a wireless transceiver 385, and (optionally) an SPS receiver 387. The SPS receiver 387 may be configured similarly to the SPS receiver 217 to be capable of receiving and acquiring SPS signals 360 via an SPS antenna 388. The processor 381 may include one or more intelligent hardware devices, e.g., a central processing unit (CPU), a microcontroller, an application specific integrated circuit (ASIC), etc. The processor 381 may comprise multiple processors (e.g., including a general-purpose/application processor, a DSP, a modem processor, a video processor, and/or a sensor processor as shown in FIG. 2). The memory 382 is a non-transitory storage medium that may include random access memory (RAM)), flash memory, disc memory, and/or read-only memory (ROM), etc. The memory 382 stores the software 383 which may be processor-readable, processor-executable software code containing instructions that are configured to, when executed, cause the processor 381 to perform various functions described herein. Alternatively, the software 383 may not be directly executable by the processor 381 but may be configured to cause the processor 381, e.g., when compiled and executed, to perform the functions. The description may refer to the processor 381 performing a function, but this includes other implementations such as where the processor 381 executes software and/or firmware. The description may refer to the processor 381 performing a function as shorthand for one or more of the processors contained in the processor 381 performing the function. The processor 381 may include a memory with stored instructions in addition to and/or instead of the memory 382. Functionality of the processor 381 is discussed more fully below.

The wireless transceiver 385 is configured to communicate with other devices through wireless connections using BT protocols. For example, the wireless transceiver 385 may include a transmitter 392 and receiver 394 coupled to one or more antennas 396 for transmitting (e.g., on one or more uplink channels) and/or receiving (e.g., on one or more downlink channels) BT wireless signals 398 and transducing signals from the BT wireless signals 398 to wired (e.g., electrical and/or optical) signals and from wired (e.g., electrical and/or optical) signals to the BT wireless signals 398. In an example, the wireless transceiver 385 may include multiple transmitters that may be discrete components or combined/integrated components, and/or the receiver 394 may include multiple receivers that may be discrete components or combined/integrated components. In an example, the wireless transceiver 385 may be configured to communicate signals according to a variety of radio access technologies (RATs) in addition to BT technologies. For example, the wireless transceiver 385 may be also configured to utilize RATs such as IEEE 802.11 (including IEEE 802.11ax/az and 802.11be), WiFi, WiFi Direct (WiFi-D), UWB, IEEE 802.15 (UWB), Zigbee etc.

Figure 4:
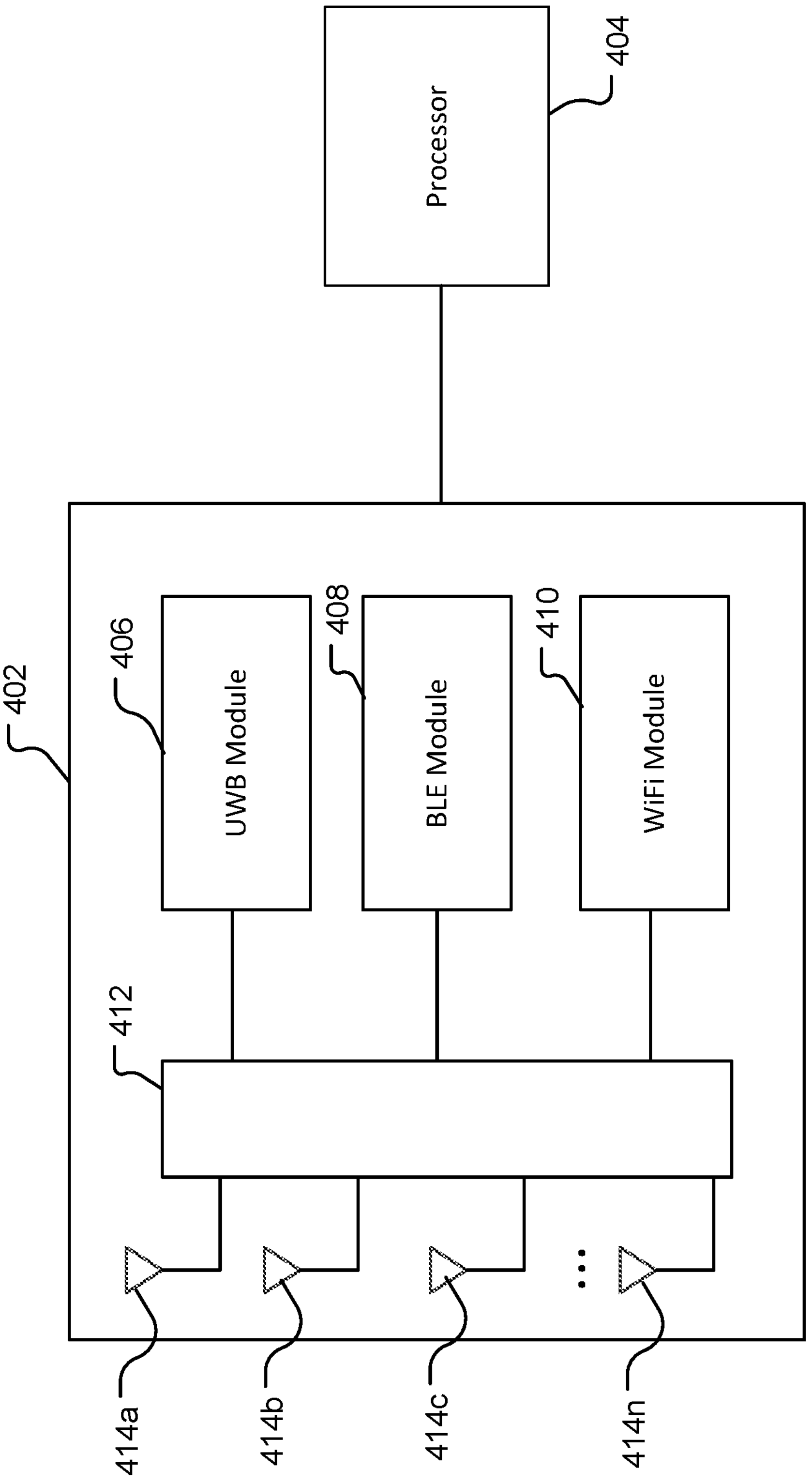
FIG. 4 is a block diagram of an example communications module with multiple transceivers.

Referring to FIG. 4, a block diagram of an example communications module 402 with multiple transceivers is shown. The communications module 402 may be used as a transceiver in a mobile device, such as the transceiver 215 in the UE 200, a transceiver in an access point, such as the transceiver 315 in the AP 300, or other RF device, such as the transceiver 385 in the BT device 380. In an example, in a V2X network, the communication module may be included in a Roadside Unit (RSU). The communications module 402 may be communicatively coupled to a processor 404, such as the general-purpose processor 230 and/or the modem processor 232. One or more RF modules such as a UWB module 406, a BLE module 408, and a WiFi module 410 may be communicatively coupled to a plurality of antennas 414*a-n* via one or more multiplexers 412. The multiplexers 412 may include switches, phase shifters, and tuning circuits configured to enable one or more of the RF modules 406, 408, 410 to send and receive signals via one or more of the antennas 414*a-n*. For example, the WiFi module 410 and the UWB module 406 may be configured to utilize one or more of the antennas 414*a-n* based on operational frequencies. The phase shifters, and other components within the multiplexers 412 (e.g., a Butler matrix), may enable beamforming to increase transmit or receive gain on different boresight angles from the location of the antennas 414*a-n*. In an example, each of the antennas 414*a-n* may be an antenna module including an antenna array. The antenna arrays may have different number of elements in various configurations. For example, each of the antennas 414*a-n* may be 1×2, 1×3, 1×4, 2×2, 2×3, 2×4, 3×3, 3×4, etc. arrays. Other arrays of antenna elements may also be used.

Figure 5:
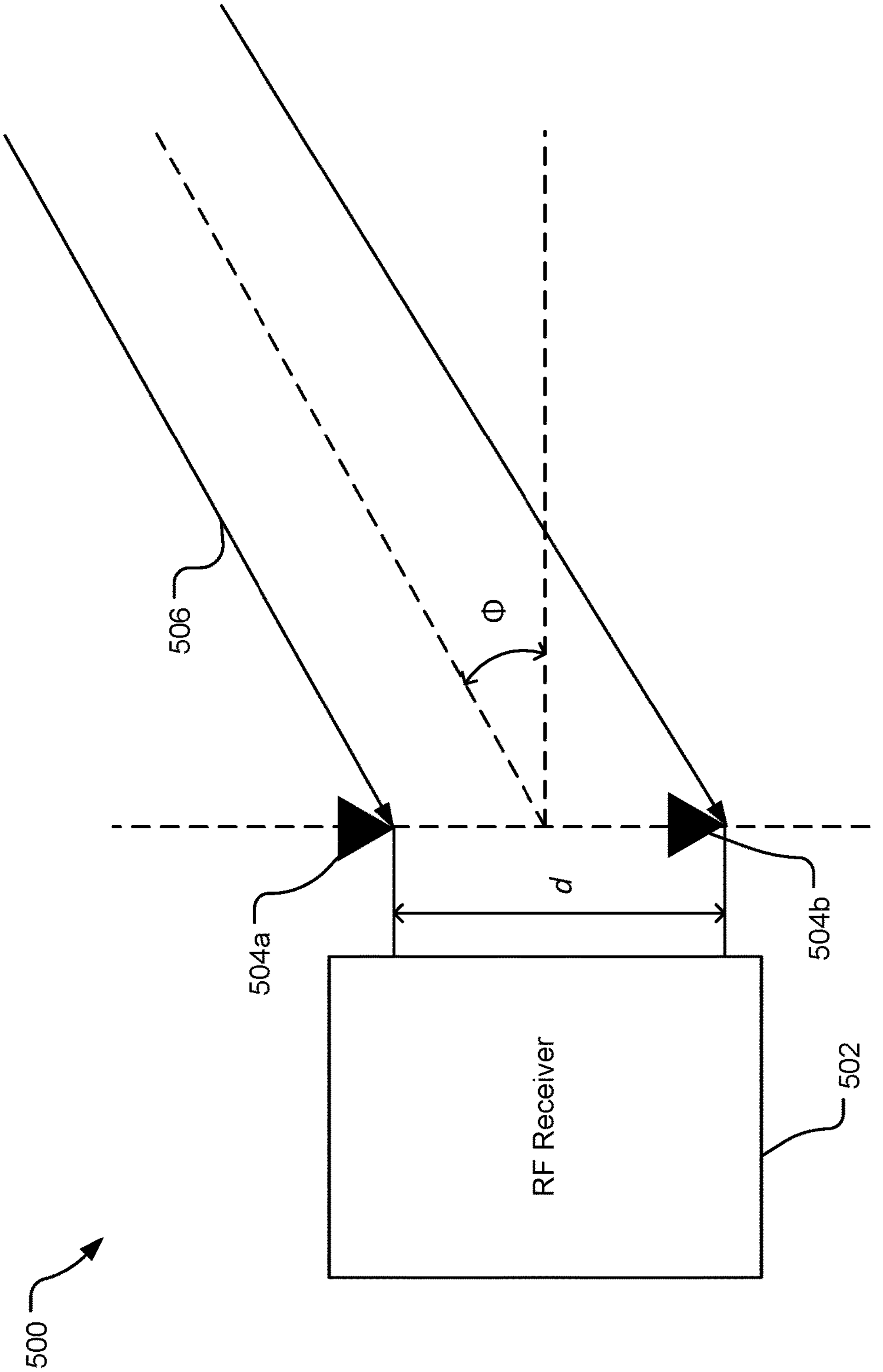
FIG. 5 is a diagram of an example angle of arrival of a radio frequency signal.

Referring to FIG. 5, a diagram 500 of an example angle of arrival of a RF signal is shown. The diagram 500 includes a RF receiver 502 (e.g., the UWB module 406, the BLE module 408, the WiFi module 410, etc.) with a plurality of antennas 504*a*, 504*b* in an antenna array. A RF signal 506 is detected at an angle of arrival (AoA) @ by the antenna array. In general, the AoA is based on a time difference between the arrival of the RF signal 506 at each of the antennas 504*a*, 504*b* in the antenna array. The time delay between the arrival of the signals may be determined as:

$$t=d^{*}\sin\Phi/c \quad (1)$$

where, t is the time delay;

d is the distance between the antennas;

Φ is the AoA; and c is the speed of light.

In operation, the RF receiver 502 may be configured to determine an AoA with an accuracy of approximately of +/−5 degrees. Other radio technologies and receiver/transceiver/antenna configurations may realize different accuracy results.

Figure 6:
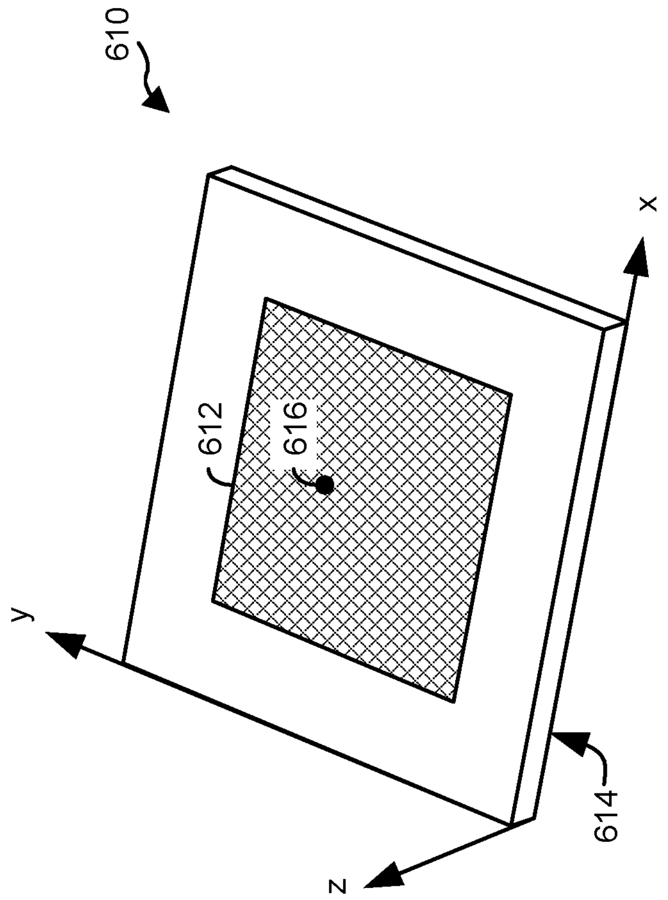
FIG. 6 shows an example design of a patch antenna.

Referring to FIG. 6, an exemplary design of a patch antenna 610 is shown. The patch antenna 610 includes a radiator such as a conductive patch 612 formed over a ground plane 614. A dielectric substrate may be presented between radiator and ground plane. The dimensions of the patch may be based on the operational frequency of the associated transceiver. For example, a patch 612 designed for 2.4 GHz may have length and width dimensions in the range of 30 mm to 40 mm. The dimensions may vary based on different use cases, form factors and characteristics of dielectric material, such as permittivity value and thickness. The ground plane 614 for a 2.4 GHz may be in the range of 40 mm to 50 mm based on a desired directivity of patch antenna 610. A larger ground plane may result in smaller back lobes. In an example, a feed point 616 is located near the center of the patch 612 and is the point at which an output RF signal is applied to the patch antenna 610 for transmission. Multiple feed points may also be used to vary the polarization of the patch antenna 610. For example, at least two conductors may be used for dual polarization (e.g., a first conductor and a second conductor may be used for a horizontal-pol feed line and a vertical-pol feed line). The locations and number of the feed points may be selected to provide the desired impedance match to a feedline. Additional patches may be assembled in a one-dimensional or two-dimensional array (e.g., 1×2, 1×3, 1×4, 1×5, 2×2, 2×3, 2×4, 3×3, 3×4, etc . . . ) to further provide a desired directivity and sensitivity. The ground plane 614 may be disposed under all of the patches in the array.

Figure 7A:
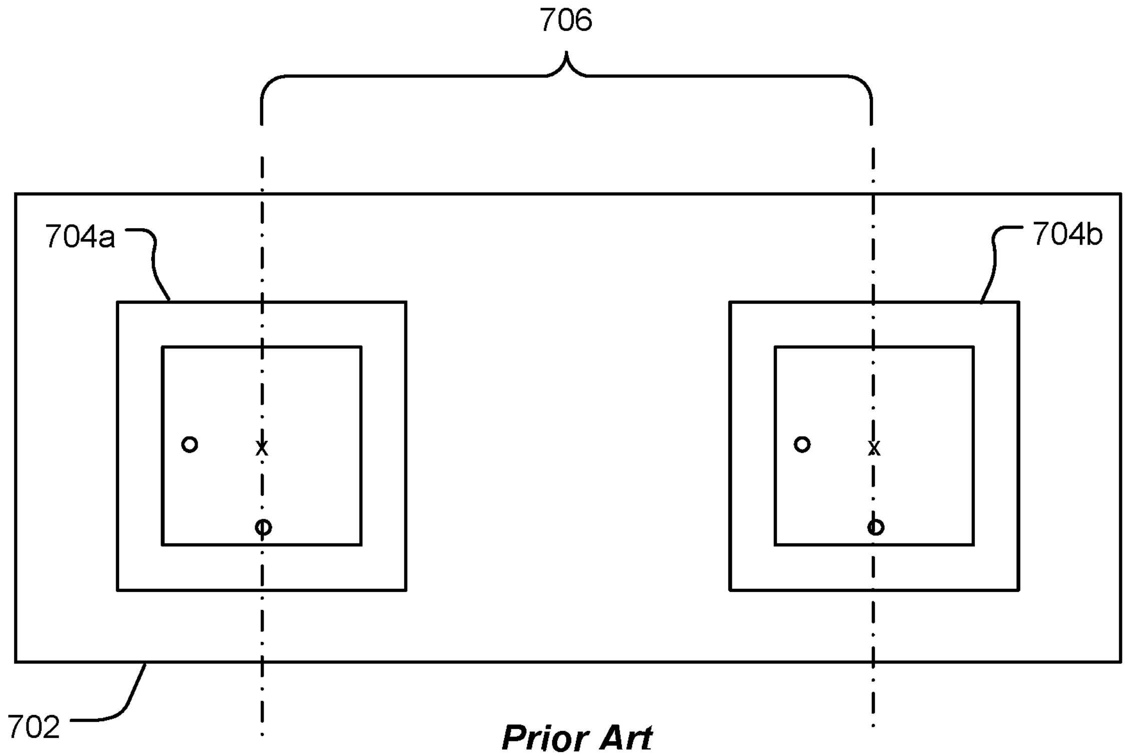
Prior Art FIG. 7A
FIG. 7A is a top-view illustration of a prior art antenna array without a resonator element.

Referring to FIG. 7A, a top-view illustration of a prior art antenna array without a resonator element is shown. In general, an antenna array that is capable of obtaining AoA measurements such as described in FIG. 5, requires multiple elements to detect the phase difference of the received RF signal to determine the AoA. An increase in the number of antenna elements may increase the accuracy of the angle estimate but it will also increase the overall size of the antenna array. A prior art antenna array 702 may include two or antenna elements, such as a first patch antenna element 704*a* and a second patch antenna element 704*b*. The antenna elements 704*a*, 704*b* may be spaced apart a first distance 706 to obtain an isolation value of at least 15 dB from one another. An isolation of greater than 15 dB between the elements is an example value used for AoA capable antenna modules. For a 2.4 GHz antenna module (e.g., BT), the first distance may be approximately 5 cm. The resulting size of a 4×4 antenna array which achieves the 15 dB isolation value, is approximately 160 mm by 160 mm. The resonator techniques described herein may be used to reduce the size of a AoA capable antenna array.

Figure 7B:
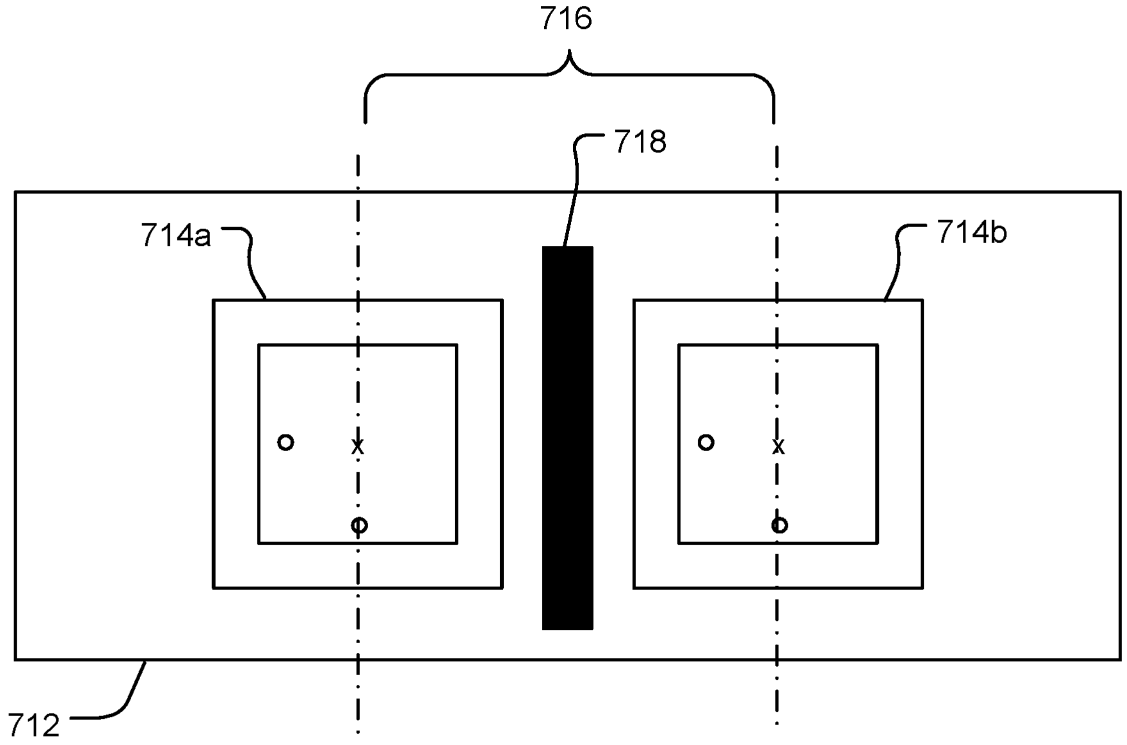
FIG. 7B is a top-view illustration of an antenna array with a resonator element.

Referring to FIG. 7B, a top-view illustration of an antenna array 712 with a resonator element 718 is shown. The addition of the resonator element 718 between a first patch antenna element 714*a* and a second patch antenna element 714*b* enables a reduced distance 716 between the antenna elements 714*a*, 714*b*. The addition of such resonator elements may enable a reduction of the overall dimensions for the antenna array 712 as compared to the prior art antenna arrays without such resonator structures. The resonator element 718 may enable an isolation value of greater than 15 dB between antenna elements and greater phase discrimination at each of the antenna elements. For example, the reduced distance 716 may be approximately 3.2 cm (e.g., as compared to the 5 cm spacing in the prior art antenna array 702). An example 4×4 antenna array with resonator elements disposed between each of the horizontal and vertical antenna elements may reduce the size from the 160 mm×160 mm of the prior art, to a smaller antenna array of 148 mm×148 mm. In an example, the resonator element 718 may be a metamaterial configured to resonate at the operational frequency of the antenna array 712. The resonator element 718 is configured to reduce the level of induced current, from one antenna element to another, and the energy of fields generated by the current induced at the resonator may be confined to the resonator structure. An example technique provided herein utilizes a repeating S-shaped strip which is deposited on a substrate with the patch antenna elements 714*a*, 714*b* to create resonate non-closed/semi-closed loop structures. In multi-layer antenna designs, the resonator element 718 may be printed on other layers. The dimensions of the antenna arrays 702, 712 and associated antenna elements are examples, and not limitations, as other operational factors may impact the size of the arrays and elements.

Figure 8:
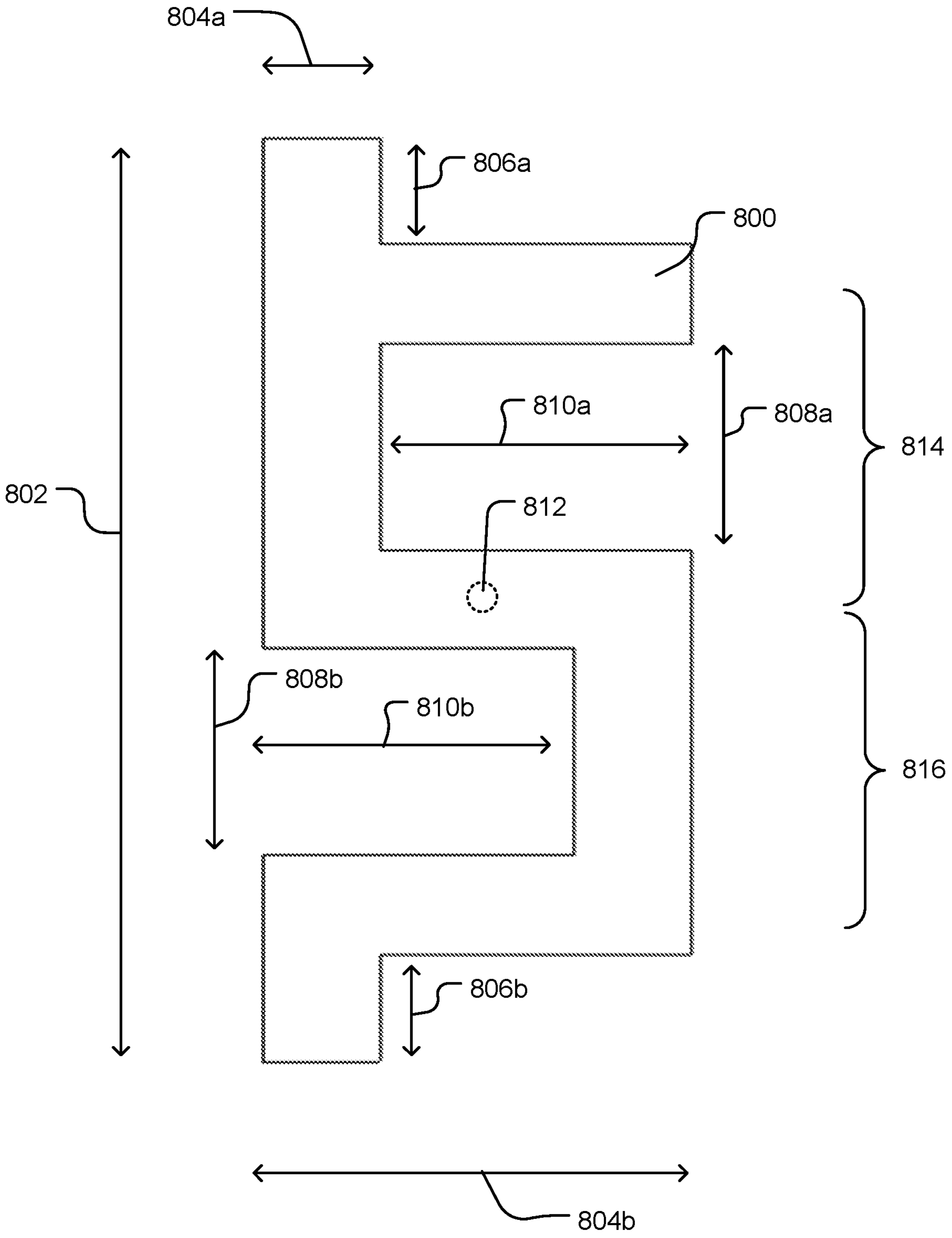
FIG. 8 is a diagram of an example S-shaped conductor for use in a resonator element.

The techniques provided herein utilize resonator elements which may be combined to form shapes to generate semi-closed loops configured to trap electromagnetic fields and reduce the coupling between the antennas. In an example, referring to FIG. 8, a diagram of an example S-shaped conductor 800 for use in a resonator element is shown. The S-shaped conductor 800 may be an example metamaterial comprised of a repeating pattern of the S-shaped conductor 800 to form a resonator element 718. The dimensions of the resonator are proportional to the operational wavelength and are typically around one tenth of the operational wavelength. In general, for metamaterial designs, the S-shaped conductor 800 may be a microstrip conductor printed on a PCB proximate to an antenna element, such as the patch 612. The boxy shape (e.g., right angles) of the S-shaped conductor 800 depicted in FIG. 8 is an example, and not a limitation. In general, an S-shaped conductor may include a first half

814 with a first curvature and a second half 816 with a second curvature which is in an opposite direction of the first curvature. A theoretical inflection point 812 may be located between the first half 814 and the second half 816. The boxy shape of the S-shaped conductor 800 may be implemented based on cost effective manufacturing processes. That is, applying a microstrip with a boxy curve shape may be more cost effective than applying designs which are rounded. The overall length 802 of the S-shaped conductor is based on the operational frequency of the associated antenna array. In an example, the overall length 802 may be in an order of one tenth of the wavelength of the operational frequency (e.g., approximately 12 mm for a 2.45 GHz signal when not considering the permittivity of the substrate used to design the resonator). A conductor width 804*a* may be based on manufacturing limitations and is typically in a range of 0.5 mm to 2 mm. An overall width 804*b* may be in the range of 2-5 mm. Thinner widths may also be used. The S-shaped conductor 800 may include an upper tab 806*a* and a lower tab 806*b* that are each approximately 1.5 mm in length. An upper curve opening 808*a* and a lower curve opening 808*b* may have a length of approximately 2.7 mm. An upper throat length 810*a* and a lower throat length 810*b* may have a length of approximately 4 mm. The dimensions of the S-shaped conductor 800 are examples based on a 2.4 GHz operating frequency. Other dimensions may be used because the permittivity of the substrate may vary the design. In an example, the overall length 802 may be 5.6 mm, the conductor width 804*a* may be 0.6 mm, an overall width 804*b* may be 2.2 mm, the upper and lower tabs 806*a-b*, may be 0.65 mm, the upper and lower curve openings 808*a-b* may be 1.25 mm, and the upper and lower throat lengths 810*a-b* may be 1.6 mm.

The S-shaped conductors 800 are an example, of resonators which may be combined to form shapes to generate semi-closed loops configured to trap electromagnetic fields and reduce the coupling between the antennas. When a plurality of S-shaped conductors 800 are assembled into a resonator structure, the dimensions of the loops created by S-shaped conductors are configured to enable current flowing on each half of the loop in opposite directions. The counter flowing currents help to weaken the field generated by induced current from a neighboring antenna elements, which increases the isolation between the antenna elements. The dimensions of the S-shaped conductor may be varied to modify the induced current and electro-magnetic coupling with the neighboring antenna elements.

Figure 9:
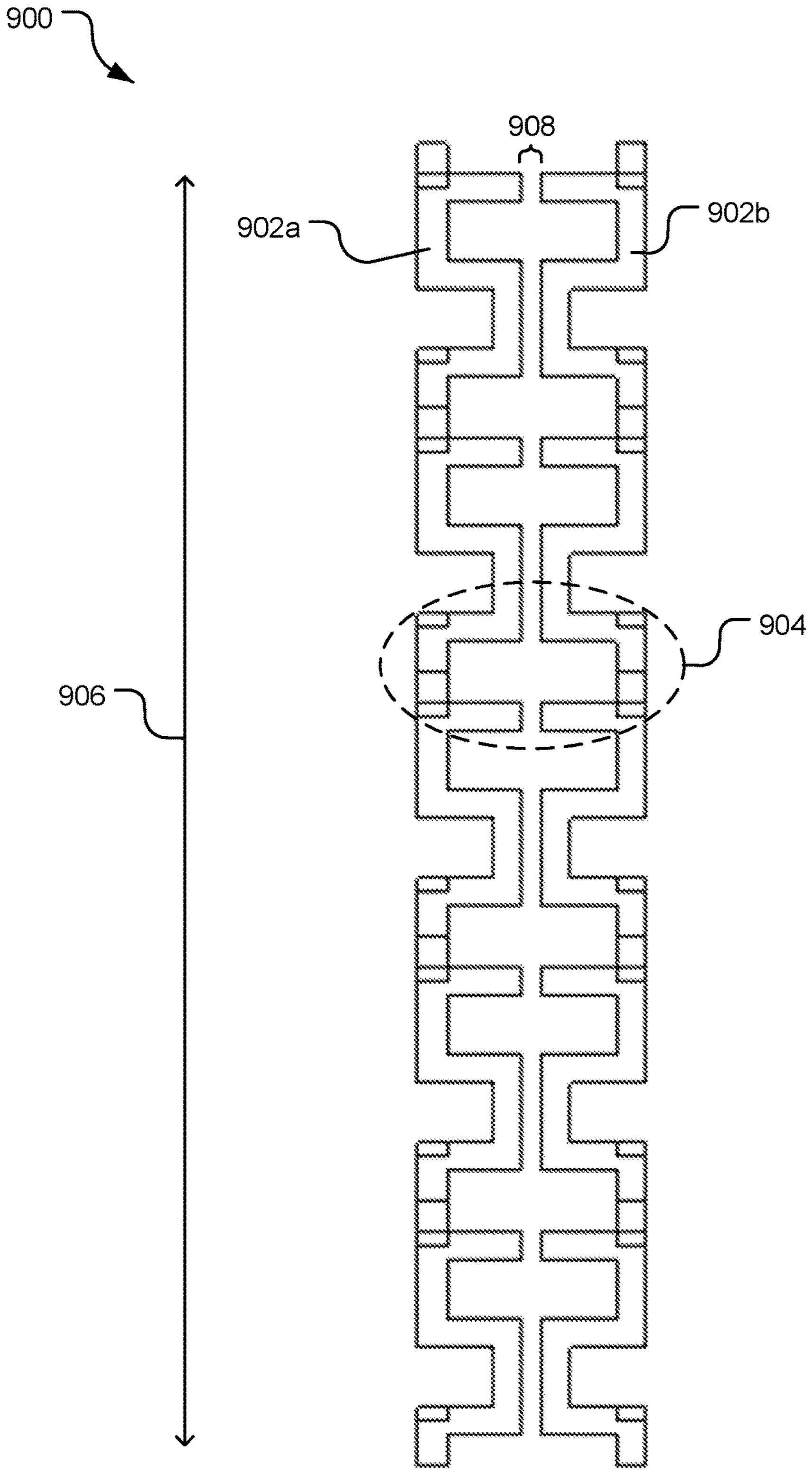
FIG. 9 is a diagram of an example resonator element including two rows of repeating S-shaped conductors.

Referring to FIG. 9, a diagram of an example resonator element 900 including two rows of repeating S-shaped conductors 800 is shown. The resonator element 900 includes a first row of repeating S-shaped conductors 902*a* in a first orientation and a second row of repeating S-shaped conductors 902*b* in a second orientation. The first and second rows 902*a*, 902*b* are disposed such that they mirror one another. For example, the second orientation may be rotated 180 degrees relative to the first orientation to create the mirroring orientation. In an example, the first and second rows 902*a*, 902*b* are separated from one another by a gap 908. The size of the gap 908 may be in the range of 0.05 mm to 0.8 mm. In an example, the gap 908 is 0.4 mm. Each of the S-shaped conductors 800 in the respective rows 902*a*, 902*b* are electrically coupled to the other S-shaped conductors 800 in their respective rows. For example, the upper tab 806*a* of a first S-shaped conductor may be physically connected to a lower tab 806*b* of the neighboring S-shaped conductor. The first and second rows 902*a*, 902*b* are aligned such that a plurality of non-closed loops 904 (i.e., also referred to as semi-closed) are created along the length of the resonator element 900. The current flowing on each half of the non-closed loops 904 have opposite directions, which helps to weaken the field generated by induced current from a proximate antenna, therefore, increases the isolation level between antennas on either side of the resonator element 900. Other shapes may be used to create non-closed loop structures configured to resonate at the operational frequency of the antenna array. In an example, a metamaterial may be configured with a plurality of non-closed loop structures configured to weaken the current induction on adjacent patches. A resonator length 906 may be approximately equal to a length of a patch antenna element for the operational frequency. For example, for a 2.4 GHz antenna array the resonator length 906 may be in the range of 30 mm to 60 mm based on the size of the antenna patches and potential ground plane elements associated with each patch.

Figure 10:
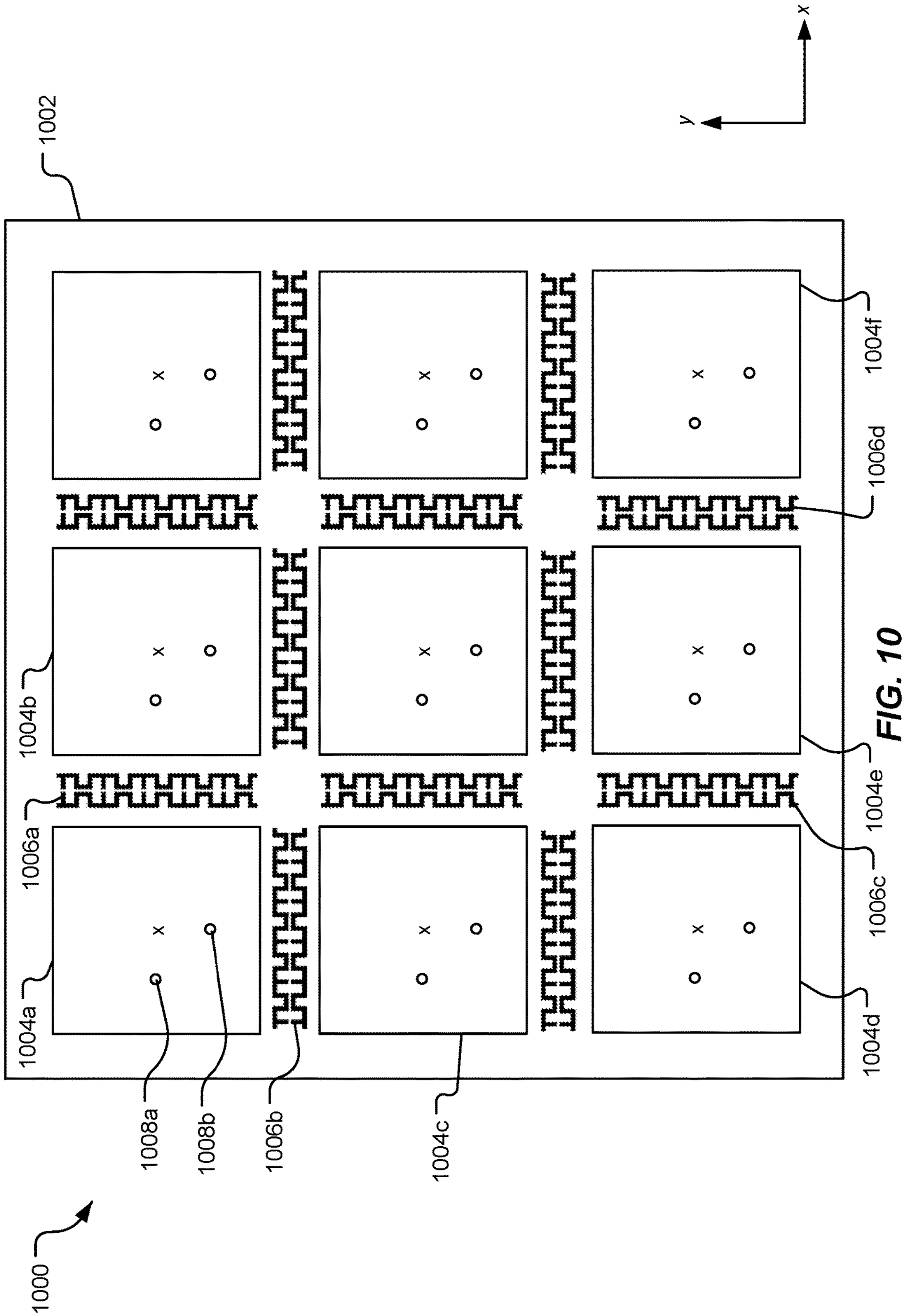
FIG. 10 is a top-view illustration of an example antenna array with horizontal and vertical resonator elements.

Referring to FIG. 10, a top-view illustration of an example antenna array 1000 with horizontal and vertical resonator elements is shown. The antenna array 1000 may be implemented as one or more of the antennas 414*a-n*, or other antennas described herein. In an example, the antenna array 1000 may be operably coupled to the BLE module 408, or other BTE transceiver system (e.g., the antenna 396 in the BT device 380). The antenna array 1000 is an example of a 3×3 array including nine antenna elements and 12 resonator elements disposed on a PCB substrate 1002. The substrate 1002 may be FR-4 (Flame Retardant Level 4), or other PCB substrates as known in the art (e.g., polytetrafluoroethylene (PTFE), etc.). The substrate 1002 for the antenna array 1000 may be approximately 120 mm by 120 mm. Each of the resonator elements in the antenna array 1000 is a resonator element 900 including the two rows of repeating S-shaped conductors 902*a*, 902*b*. The size of the array and the corresponding number of antenna elements and resonator elements are examples, and not limitations, as other sizes and configurations of arrays may be used. Each of the antenna elements may be a patch antenna, such as the patch antenna 610, and may include one or more feed connections for horizontal and/or vertical polarization. For example, a first antenna element 1004*a* may include a first feed connection 1008*a* and a second feed connection 1008*b*. The locations of the feed connections 1008*a*, 1008*b* are examples. Other feed connections may be used. The first antenna element 1004*a* may be disposed next to a second antenna element 1004*b* and above a third antenna element 1004*c*, as depicted in FIG. 10. A first resonator element 1006*a* may be disposed between the first and second antenna elements 1004*a*, 1004*b*, and a second resonator element 1006*b* may be disposed between the first antenna element 1004*a* and the third antenna element 1004*c*. The first resonator element 1006*a* is disposed along a Y-axis and the second resonator element 1006*b* is disposed along an X-axis. Each of the resonator elements in the antenna array 1000 is disposed between two antenna elements as depicted in FIG. 10. The presence of the resonator elements weakens the current induction in adjacent patch antenna elements because current will flow in opposite directions on the resonators with respect to the current flowing at the edge of a patch antenna element. The resonators make the energy of EM fields generated by the induced current to resonate at the resonator structure. That is, the resonator elements confine the energy with the S-shaped conductor structures which assists in increasing the isolation of the antenna elements. In an example, the antenna array 1000 may be configured for the 2.4 GHz spectrum band (e.g., 2400 to 2483.5 MHz). The antenna array 1000 may be configured (e.g., different element sizes and spacing) for other frequency bands.

Figure 11:
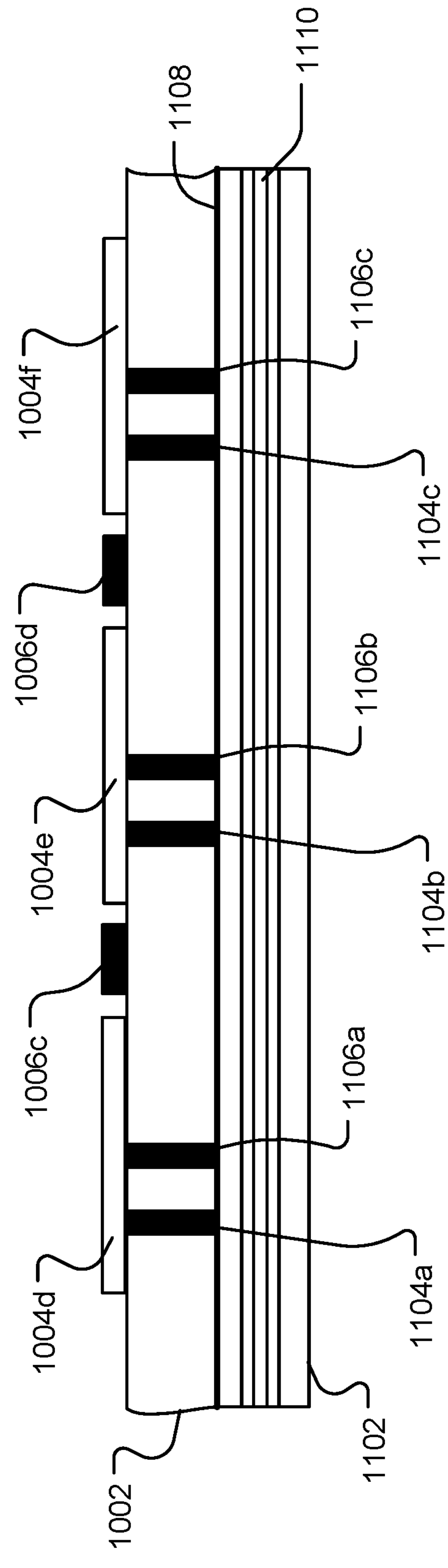
FIG. 11 is a side-view illustration of the example antenna array in FIG. 10.

Referring to FIG. 11, a side-view of the example antenna array 1000 is shown. The side-view depicts a fourth antenna element 1004*d*, a fifth antenna element 1004*e*, and a sixth antenna element 1004*f* disposed on or in the substrate 1002. A third resonator element 1006*c* is disposed between the fourth and fifth antenna elements 1004*d*, 1004*e*, and a fourth resonator element 1006*d* is disposed between the fifth and sixth antenna elements 1004*e*, 1004*f*. The resonator elements 1006*c*, 1006*d* may be disposed on or in the substrate 1002. In a multi-layer PCB, the antenna elements and resonator elements may be disposed on different layers. In an example, the substrate 1002 is a planar substrate with a top surface and a bottom surface, and may be coupled at one of those surfaces to another substrate 1102 including one or more signal lines 1110. The substrate 1002 and/or the other substrate 1102 may include a conductive cladding 1108 (e.g., Cu, Ag, etc.) configured as a ground plane. The other substrate 1102 may be communicatively coupled to a transceiver (e.g., or receiver or transmitter) in a RF module (e.g., the BLE module 408). The other substrate 1102 may comprise a PCB, and the signal lines 1110 may be microstrip lines configured to transfer electrical signals to and from vias and feed point of the antenna elements. For example, signal lines may be coupled to a first set of vias 1104*a*, 1106*a*, a second set of vias 1104*b*, 1106*b*, and a third set of vias 1104*c*, 1106*c* which are coupled to the fourth, fifth and sixth antenna elements 1004*d*, 1004*e*, 1004*f*, respectively. The vias may be feedlines corresponding to vertical and horizontal polarization. In an example, the substrate 1002 may be a printed circuit board material (e.g., prepreg) with a dielectric constant Dk in the range of about 4.4 to about 6.4, in a range of about 5.0 to about 9.8, or in a range of about 9.0 to about 9.8. In some particular examples, Dk values of about 5.4 or about 9.4 may be used. More broadly, the Dk can be in a range of about 3.0 to about 12, and dimensions of the substrate may be adjusted accordingly.

Figure 12:
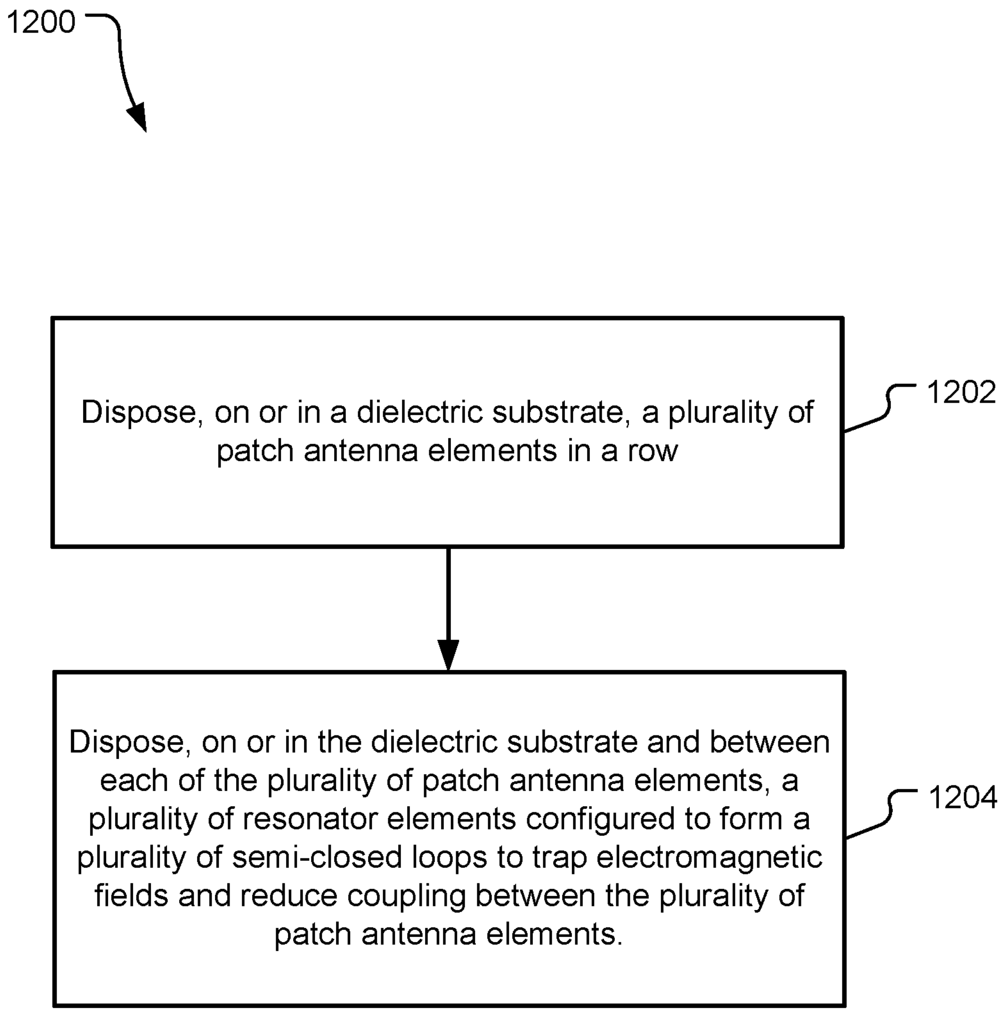
FIG. 12 is a process flow diagram of an example method for manufacturing an antenna array with improved antenna element isolation.

Referring to FIG. 12, with further reference to FIGS. 1-11, a method 1200 for manufacturing an antenna array with improved antenna element isolation includes the stages shown. The method 1200 is, however, an example and not limiting. The method 1200 may be altered, e.g., by having stages added, removed, rearranged, combined, performed concurrently, and/or having single stages split into multiple stages. For example, the method 1200 may be modified to include implementation of the optional features noted in the summary, including for manufacturing an embodiment patch array antenna with resonator elements.

At stage 1202, the method includes disposing, on or in a dielectric substrate, a plurality of patch antenna elements. In an example, the plurality of patch antenna elements may include a plurality of conductive patches 612 configured in an array such as depicted in FIGS. 7B, 10 and 11. Other one-dimensional and two-dimensional array sizes (e.g., 1×2, 1×3, 1×4, 1×8, 2×2, 2×3, 2×4, 2×6, 2×8, 3×4, 4×4, 4×8, etc.) may be used. The dielectric substrate may be the substrate 1002. In an example, the patch antenna elements may be configured for an operational frequency associated with BT or WiFi operations (e.g., 2.4 GHz). Other frequencies may also be used.

At stage 1204, the method includes disposing, on or in the dielectric substrate and between each of the plurality of patch antenna elements, a plurality of resonator elements configured to form a plurality of semi-closed loops to trap electromagnetic fields and reduce coupling between the plurality of patch antenna elements. In an example, the plurality of resonator elements may include a first repeating S-shaped conductor in a first orientation, and a second repeating S-shaped conductor in a second orientation, wherein the second orientation is rotated 180 degrees relative to the first orientation. The plurality of resonator elements may include the resonator element 900 and the first and second S-shaped conductors are the first and second rows of repeating S-shaped conductors 902*a*, 902*b*. The first and second orientations that are rotated 180 from one another result in the mirroring configuration depicted in FIG. 9. The mirroring configuration creates a plurality of semi-closed loops 904 (i.e., non-closed) in the resonator elements. The resonator elements may be disposed between the patch antennas as depicted in FIGS. 10 and 11. The resonator elements may be deposited on the dielectric substrate as microstrips, or other deposition an/or etching techniques as known in the art. The resonator elements by be comprised of copper, aluminum, or other conducting material. In an example, the resonator elements may be metamaterials configured to interact with electromagnetic radiation at the operational frequency of the patch antenna elements. The metamaterial may include a plurality of non-closed loops configured to reduce the induced current from one patch antenna element to another and confine the energy of fields generated by current induced at the resonator within the metamaterial. The presence of the resonator elements weakens the current induction in adjacent patch antenna elements because current will flow in opposite directions on the resonators with respect to the current flowing at the edge of a patch antenna element. The resonator elements are configured to make the energy of EM fields generated by the induced current to resonate based on the configuration of the non-closed loop structures.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure). Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that the device be a mobile device, but indicates that the device includes wireless communication capability (one-way or two-way), e.g., includes at least one radio (each radio being part of a transmitter, receiver, or transceiver) for wireless communication.

"About" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

In particular, example length and width measurements are given for embodiment patch antennas, patch antenna arrays and resonator elements herein. In using the term "about" or "approximately" in reference to these measurements, tolerance indicated by these terms can be readily ascertained by those of skill in the art, in view of this description, based on (i) the frequency band to be produced by a given patch, (ii) a degree of need to optimize the center of the frequency band for greatest overall gain in the intended band, and (iii) interaction of the length and width measurements with other features of the patch antenna itself, or surrounding features, that can affect frequency band.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements without departing from the scope of the disclosure.

Implementation examples are described in the following numbered clauses:

Clause 1. An antenna array, comprising: a plurality of patch antenna elements disposed on a planar substrate; and one or more resonator elements disposed on the planar substrate and between each of the plurality of patch antenna elements, wherein each of the one or more resonator elements includes a first repeating S-shaped conductor in a first orientation, and a second repeating S-shaped conductor in a second orientation that is rotated 180 degrees relative to the first orientation.

Clause 2. The antenna array of clause 1 wherein the plurality of patch antenna elements comprise a single row of patch antenna elements.

Clause 3. The antenna array of clause 1 wherein the plurality of patch antenna elements are configured in a two-dimensional array.

Clause 4. The antenna array of clause 3 wherein a first set of the one or more resonator elements are disposed along a first axis of the planar substrate, and a second set of the one or more resonator elements are disposed along a second axis of the planar substrate.

Clause 5. The antenna array of clause 1 wherein each of the plurality of patch antenna elements is a square defined by a first length and a length of each of the one or more resonator elements is equal to the first length.

Clause 6. The antenna array of clause 1 wherein each of the plurality of patch antenna elements is electrically coupled to a first feedline configured for a first polarization.

Clause 7. The antenna array of clause 6 wherein each of the plurality of patch antenna elements is electrically coupled to a second feedline configured for a second polarization that is different from the first polarization.

Clause 8. The antenna array of clause 1 wherein the plurality of patch antenna elements and the one or more resonator elements are configured for an operational frequency within the 2.4 GHz spectrum band.

Clause 9. The antenna array of clause 1 wherein the one or more resonator elements comprise a metamaterial.

Clause 10. An antenna array, comprising: a first antenna element disposed on a planar substrate; a second antenna element disposed on the planar substrate; and a resonator element disposed on the planar substrate and between the first antenna element and the second antenna element, wherein the resonator element includes a plurality of semi-closed loop structures configured to resonate at an operational frequency associated with the first antenna element and the second antenna element.

Clause 11. The antenna array of clause 10 wherein the first antenna element and the second antenna element are square patch antennas of a first length and a length of the resonator element is equal to the first length.

Clause 12. The antenna array of clause 10 wherein the first antenna element and the second antenna element are configured for horizontal and vertical polarization.

Clause 13. The antenna array of clause 10 wherein the planar substrate is a multi-layer substrate and the first antenna element and the second antenna element are disposed on a first layer of the multi-layer substrate and the resonator element is disposed on a second layer of the multi-layer substrate.

Clause 14. The antenna array of clause 10 wherein the resonator element includes one or more microstrip conductors disposed on the planar substrate.

Clause 15. The antenna array of clause 10 wherein the resonator element includes a first repeating S-shaped conductor in a first orientation, and a second repeating S-shaped conductor in a second orientation that is rotated 180 degrees relative to the first orientation.

Clause 16. The antenna array of clause 10 wherein the resonator element comprises a metamaterial disposed on the planar substrate.

Clause 17. The antenna array of clause 10 wherein the operational frequency within the 2.4 GHz spectrum band.

Clause 18. A method for manufacturing an antenna array with improved antenna element isolation, comprising: disposing, on or in a dielectric substrate, a plurality of patch antenna elements; and disposing, on or in the dielectric substrate and between each of the plurality of patch antenna elements, a plurality of resonator elements configured to form a plurality of semi-closed loops to trap electromagnetic fields and reduce coupling between the plurality of patch antenna elements.

Clause 19. The method of clause 18 wherein the plurality of resonator elements include a first repeating S-shaped conductor in a first orientation, and a second repeating S-shaped conductor in a second orientation, wherein the second orientation is rotated 180 degrees relative to the first orientation.

Clause 20. The method of clause 18 wherein disposing the plurality of resonator elements includes depositing a microstrip conductor on or in the dielectric substrate.

Clause 21. The method of clause 18 wherein disposing the plurality of resonator elements includes disposing a metamaterial on or in the dielectric substrate.

The invention claimed is:

1. An antenna array, comprising:

a plurality of patch antenna elements disposed on a planar substrate; and one or more resonator elements each disposed on the planar substrate and between a respective pair of the plurality of patch antenna elements, wherein each of the one or more resonator elements includes a first repeating S-shaped conductor in a first orientation, and a second repeating S-shaped conductor adjacent to the first repeating S-shaped conductor and in a second orientation that is rotated 180 degrees relative to the first orientation.

2. The antenna array of claim 1 wherein the plurality of patch antenna elements comprise a single row of patch antenna elements.

3. The antenna array of claim 1 wherein the plurality of patch antenna elements are configured in a two-dimensional array.

4. The antenna array of claim 3 wherein a first set of the one or more resonator elements are disposed along a first axis of the planar substrate, and a second set of the one or more resonator elements are disposed along a second axis of the planar substrate.

5. The antenna array of claim 1 wherein each of the plurality of patch antenna elements is a square defined by a first length and a length of each of the one or more resonator elements is equal to the first length.

6. The antenna array of claim 1 wherein each of the plurality of patch antenna elements is electrically coupled to a first feedline configured for a first polarization.

7. The antenna array of claim 6 wherein each of the plurality of patch antenna elements is electrically coupled to a second feedline configured for a second polarization that is different from the first polarization.

8. The antenna array of claim 1 wherein the plurality of patch antenna elements and the one or more resonator elements are configured for an operational frequency within the 2.4 GHz spectrum band.

9. The antenna array of claim 1 wherein the one or more resonator elements comprise a metamaterial.

10. The antenna array of claim 1 wherein two consecutive sections of the first repeating S-shaped conductor and a corresponding two consecutive sections of the second repeating S-shaped conductor form two semi-closed loops, with a first conductive peninsula of a first section of the first repeating S-shaped conductor and a second conductive peninsula of a second section of the second repeating S-shaped conductor being shared between the two semi-closed loops.

11. An antenna array, comprising:

a first antenna element disposed on a planar substrate;

a second antenna element disposed on the planar substrate; and a resonator element disposed on the planar substrate and between the first antenna element and the second antenna element, wherein the resonator element includes a plurality of semi-closed loop structures, comprising adjacent conductors, configured to resonate at an operational frequency associated with the first antenna element and the second antenna element.

12. The antenna array of claim 11 wherein the first antenna element and the second antenna element are square patch antennas of a first length and a length of the resonator element is equal to the first length.

13. The antenna array of claim 11 wherein the first antenna element and the second antenna element are configured for horizontal and vertical polarization.

14. The antenna array of claim 11 wherein the planar substrate is a multi-layer substrate and the first antenna element and the second antenna element are disposed on a first layer of the multi-layer substrate and the resonator element is disposed on a second layer of the multi-layer substrate.

15. The antenna array of claim 11 wherein the resonator element includes one or more microstrip conductors disposed on the planar substrate.

16. The antenna array of claim 11 wherein the resonator element includes a first repeating S-shaped conductor in a first orientation, and a second repeating S-shaped conductor in a second orientation that is rotated 180 degrees relative to the first orientation.

17. The antenna array of claim 11 wherein the resonator element comprises a metamaterial disposed on the planar substrate.

18. The antenna array of claim 11 wherein the operational frequency is within the 2.4 GHz spectrum band.

19. A method for manufacturing an antenna array with improved antenna element isolation, comprising:

disposing, on or in a dielectric substrate, a plurality of patch antenna elements; and disposing, on or in the dielectric substrate and between each pair of the plurality of patch antenna elements, a plurality of adjacent resonator elements configured to form a plurality of semi-closed loops to trap electromagnetic fields and reduce coupling between the plurality of patch antenna elements.

20. The method of claim 19 wherein the plurality of adjacent resonator elements include a first repeating S-shaped conductor in a first orientation, and a second repeating S-shaped conductor in a second orientation, wherein the second orientation is rotated 180 degrees relative to the first orientation.

21. The method of claim 19 wherein disposing the plurality of adjacent resonator elements includes depositing a microstrip conductor on or in the dielectric substrate.

* * * * *